United States Patent
Doell

[11] Patent Number: 5,158,160
[45] Date of Patent: Oct. 27, 1992

[54] AUTOMATIC ADJUSTING APPARATUS FOR A DUO-SERVO DRUM BRAKE

[75] Inventor: Andreas Doell, Frankfurt am Main, Fed. Rep. of Germany

[73] Assignee: Alfred Teves GmbH, Frankfurt am Main, Fed. Rep. of Germany

[21] Appl. No.: 818,497

[22] Filed: Jan. 8, 1992

Related U.S. Application Data

[63] Continuation of Ser. No. 542,274, Jun. 22, 1990, abandoned.

[30] Foreign Application Priority Data

Jun. 24, 1989 [DE] Fed. Rep. of Germany ....... 3920764

[51] Int. Cl.$^5$ ............................................. F16D 65/54
[52] U.S. Cl. ............................ 188/79.51; 188/79.56; 188/196 B; 188/79.63
[58] Field of Search ........ 188/196 B, 196 BA, 196 C, 188/196 A, 196 R, 79.51, 79.55, 79.56, 79.62, 79.63, 79.64, 79.54, 326, 79; 192/111 A

[56] References Cited

U.S. PATENT DOCUMENTS

| | | | |
|---|---|---|---|
| 2,294,293 | 8/1942 | Goepfrich | 188/326 x |
| 2,493,177 | 1/1950 | Williams | 188/79.62 x |
| 2,596,380 | 5/1952 | Dodge | 188/79.5 |
| 2,788,866 | 4/1951 | Porsche et al. | 188/79.56 |
| 2,981,379 | 4/1961 | Burrell | |
| 3,610,374 | 10/1971 | Troyer | 188/79.62 |
| 3,983,970 | 10/1976 | Courbot | 188/196 B X |
| 4,595,082 | 6/1986 | Le Deit | 188/196 B X |
| 4,809,826 | 3/1989 | Charbonnier | 188/196 B X |

FOREIGN PATENT DOCUMENTS

| | | |
|---|---|---|
| 0381817 | 10/1989 | European Pat. Off. |
| 1505353 | 1/1965 | Fed. Rep. of Germany |
| 2365060 | 4/1978 | France |
| 963100 | 4/1963 | United Kingdom |
| 1090731 | 5/1964 | United Kingdom |

*Primary Examiner*—Robert J. Oberleitner
*Assistant Examiner*—Peter M. Poon
*Attorney, Agent, or Firm*—Robert P. Seitter; J. Gordon Lewis

[57] ABSTRACT

An automatic one-shot adjusting apparatus which is applicable both for mechanically and for hydraulically actuatable duo-servo drum, brakes and which includes two ratchets (6, 14) interacting through springs (11, 15) and is capable of adjusting only upon the release of the brake.

19 Claims, 1 Drawing Sheet

5,158,160

AUTOMATIC ADJUSTING APPARATUS FOR A DUO-SERVO DRUM BRAKE

This application is a continuation of application Ser. No. 07/542,274 filed Jun. 22, 1990 now abandoned.

TECHNICAL FIELD

The present invention relates to an automatic adjusting apparatus for a duo-servo drum brake, in particular, for automotive vehicles. This apparatus includes two brake shoes which are abuttable against a drum, a supporting lug at which the brake shoes take support in their position of rest, a mechanically and/or hydraulically actuatable expanding device, and at least one spring which tends to draw the two brake shoes together.

BACKGROUND OF THE INVENTION

An automatic adjusting apparatus for a leading and trailing shoe brake is known from the German printed and examined patent application No. 1,505,353. This apparatus includes a looking lever fastened to one of the brake shoes and with a locking pawl interacting with the locking lever and fastened to the same brake shoe. This mechanism cannot, however, be applied to duo-servo brakes because with these brakes the brake shoes must always abut against the supporting lug in their position of rest. Otherwise, there would be the risk that the latter is beaten off, for example, if and when, upon braking during forward driving, a braking operation in reverse movement is initiated. If, however, the supporting lug is missing, the brake shoe may rotate jointly with the drum and any braking effect will no longer be attainable.

Although automatic adjusting apparatus for leading and trailing shoe brakes have been state of the art for years, only adjusting apparatus which are exclusively applicable for service brakes with hydraulic cylinders or manual adjusting apparatus which, moreover, require expensive initial adjustment upon assembly are, as yet, available for duo-servo brakes.

SUMMARY OF THE INVENTION

The present invention has, therefore, the object to create an automatic adjusting apparatus for hydraulically or mechanically actuatable duo-servo drum brakes which is provided, in addition, with a so-called one-shot adjusting aid, that is, initial adjustment takes place by actuating the brake one or several times.

In an advantageous embodiment of the present invention, the lever and the ratchet lever are designed such that an adjustment will be possible only upon the release of the brake. An adjustment, for example, during prolonged braking when the drum becomes hot and expands is avoided by the aforementioned provision. This is necessary since otherwise the brake shoes would be urged against the drum, notwithstanding their release position, as soon as the drum has cooled down again.

In exclusively mechanically actuatable duo-servo brakes, it is particularly advantageous to design the stepped adjusting apparatus in the shape of a ratchet. The latter will always slip through the distance corresponding to the wear of the brake linings, but it cannot slip back. It is, moreover, possible to furnish such a ratchet with a buttress thread. In that case, it will slip through as described above and will nevertheless allow to be reduced in length again manually for a change of the brake linings, in order, that is, to facilitate that change.

In further embodiments of the present invention, the adjusting apparatus is designed such as to be infinitely variable, respectively, in combination with a hydraulic actuating cylinder for a service brake. This is attainable in that, upon its actuation, the piston of the cylinder does not slip back but a small predetermined length and hydraulic fluid is taken in from a reservoir.

According to another aspect of the present invention, in order to safeguard that in the release condition a clearance will always exist between the brake shoes and the drum, either the ratchet or the spring, at option, is fixed on one side in an oblong hole or in a more sizable bore, so that the adjusting action will not start until the pre-established play "s" has been overcome. Beyond the extent of the clearance, the play "s" will have to take into account the compression of the linings and the dilatation of the drum when it becomes hot.

The costs will be reduced particularly when both brake shoes are designed symmetrical, that is to say, interchangeable.

In a simple way, the ratchet lever is prestressed by a spiral spring fabricated of wire which takes support at the brake shoe and which is suspended at the ratchet lever and is secured jointly with the latter on a fixing pin.

According to another aspect of the present invention, an equilibrant of forces is provided. It is positioned between the ends of the brake shoes facing away from the expanding device and serves to prevent damage to the brake if the latter is operated when the drum is hot and dilated and in order to allow at all to release a parking brake upon the drum having cooled down again and so having shrunk in size. The equilibrant of forces is substantially comprised of a prestressed spring unit whose prestress ranges below the limit stress of critical components (drum, brake shoes, expanding device, support). In the event of the constricting force of the cooled drum exceeding the prestress, the equilibrant of forces will resiliently yield. A determined characteristic curve, which is, for example, nearly rigid as long as possible and which becomes flexible beyond a defined limit value, will be attained by the selection and the combination of the springs in the equilibrant of forces. As yet, such an equilibrant of forces could not be incorporated in duo-servo brakes because, as a rule, the manual adjusting apparatus was arranged at this point.

BRIEF DESCRIPTION OF THE DRAWING

Embodiments of the present invention and their mode of functioning will be described with reference to the accompanying drawing, in which.

DETAILED DESCRIPTION OF THE INVENTION

Figure 1:
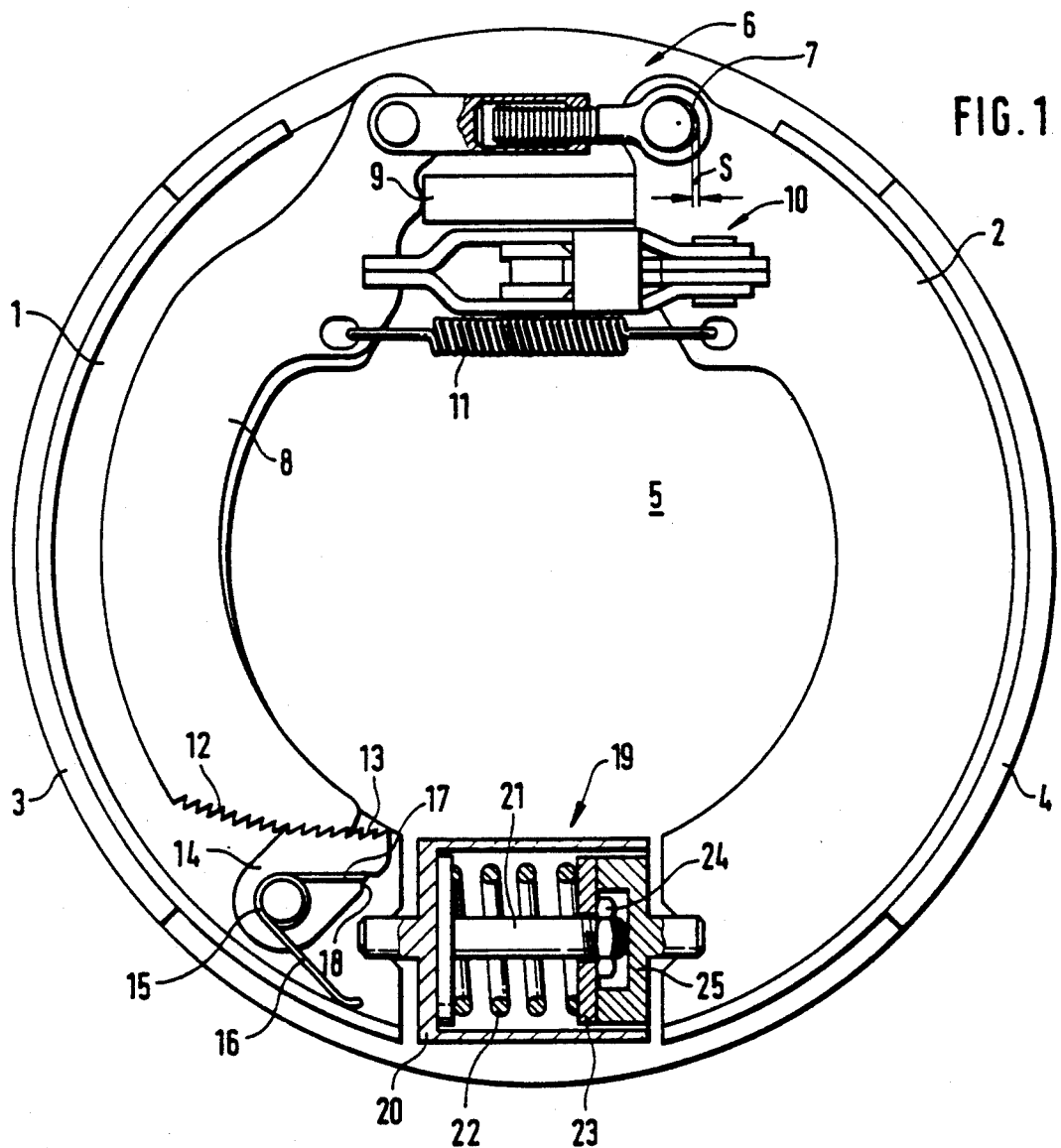
FIG. 1 shows a top view of a mechanically actuatable duo-servo drum brake with automatic adjusting apparatus and equilibrant of forces.

FIG. 1 shows the two brake shoes 1, 2 with the brake linings 3, 4. The drum against which the brake linings 3, 4 abut is not shown in the drawing. The two brake shoes 1, 2 are fixed to the cover plate 5 between the two brake shoes. An infinitely adjustable ratchet 6, configured such that its toothing allows to be screwed back manually, is between the two brake shoes 1, 2 and forms a part of the adjusting apparatus. Ratchet 6 is fixed to the second brake shoe 2 in an extended bore 7. Simultaneously ratchet 6 is secured to the first brake shoe 1 by means of a lever 8 in such a manner that the lever 8 and the brake shoe 1 are coupled to each other rigidly but jointly rotatably about a common axis at their fixation. The second brake shoe 2 and the lever 8 abut directly against the supporting lug 9. The first brake shoe 1 abuts against lug 9 only indirectly through the lever 8. The mechanical expanding device 10 and the spring 11 also act directly only on the lever 8 and on the second brake shoe 2. At its second end, the lever 8 is furnished with saw teeth 12 which engage saw tooth strip 13 at a ratchet lever 14. The ratchet lever 14 is rotatable and rigidly secured to the first brake shoe 1 and is prestressed in respect of the lever 8 by means of a spiral spring 15 which takes support at the brake shoe 1 with one arm and is hooked up at a recess 18 of the ratchet lever 14 with the other arm 17.

In the event of actuation of the mechanical expanding device 10, the lever 8 will be moved to the left and the second brake shoe 2 to the right. On overcoming of the play "s", which is determined by the extended bore 7, the ratchet 6 will start to slip through. Simultaneously, the spring 11 will be expanded and the first brake shoe 1 will be moved to the left. The lever 8 and the ratchet lever 14 will not move relative to each other since the saw teeth 12 and the saw tooth strip 13 are designed such that they do not slide along each other when the force acts on them from the inside toward the outside. This is the condition which exists during braking action. As soon as braking is ended, no expanding force will act any longer and the spring 11 will tend to draw together the first brake shoe 1 and the second brake shoe 2, respectively, the lever 8 and the second brake shoe 2. First of all, retraction will take place over the length of the play "s"—the ratchet 6 will remain in its position—then the spring 11 will draw the lever 8 in the inward direction. When the spring tension of the spring 11 is larger than that of the spiral spring 15, the saw teeth 12 will slip along the saw tooth strip 13 until the equilibrium of forces is restored and the lever 8 is in abutment against the supporting lug 9. At this moment, the second brake shoe 2 on the other side will abut again against the supporting lug 9 and adjustment is ended. Both brake shoes 1, 2 are each positioned at a distance from the drum corresponding to a clearance, which is smaller than the play "s". Initial adjustment upon the assembly of the brake is carried out by actuating the brake one or several times since the correct clearance will come about automatically.

An equilibrant of forces 19 is positioned between those two ends of the two brake shoes 1, 2 which are not facing the expanding device 10. The equilibrant of forces 19 has a housing 20 which is coupled to the first brake shoe 1 and a threaded pin 21 which is fixed to housing 20 and is surrounded by a compression spring 22. The threaded pin 21 protrudes through a plate 23 and a nut 24 is screwed onto the threaded pin. Also included in the equilibrant of forces 19 is a thrust element 25 which acts through the plate 23 on the compression spring 22 and is coupled to the second brake shoe 2. The nut 24 will prestress the compression spring 22 with the aid of the plate 23. If and when the parking brake had been drawn while the drum brake was hot, then it is often difficult, if not impossible, in state-of-the-art brakes to subsequently release the brake again when it has cooled down. Indeed, even deformations of the drum occur occasionally. This does not occur owing to the equilibrant of forces 19 since it will resiliently yield to strong forces. Damage will be safely prevented by the dimensioning of the spring.

Figure 2:
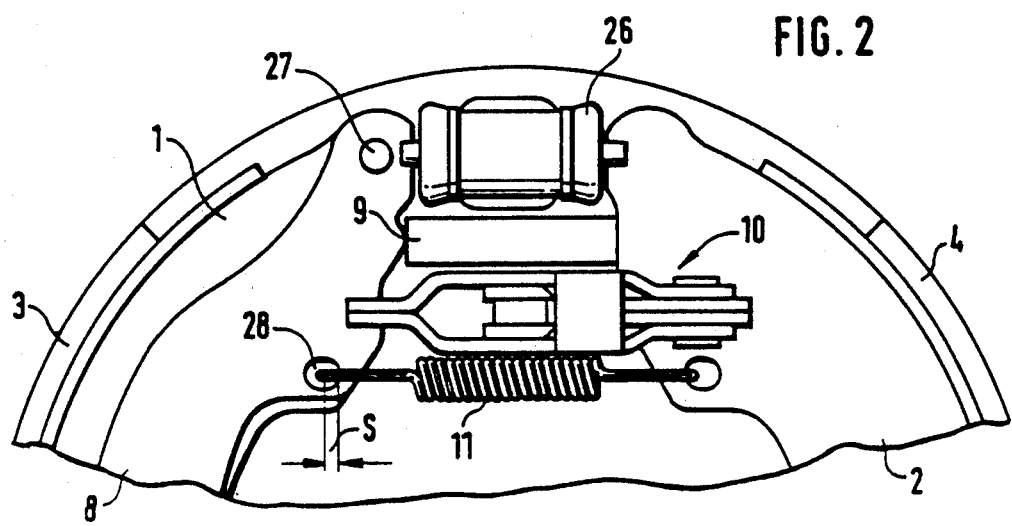
FIG. 2 shows a top view of a part of a mechanically and hydraulically actuatable duo-servo drum brake with automatic adjusting apparatus, the parts not illustrated being arranged as shown in FIG. 2.

FIG. 2 shows another embodiment of the invention, that is to say, a combined (hydraulic) service brake and (mechanical) parking brake. The arrangement, even as far as the parts not illustrated is concerned, is substantially the same as that shown in FIG. 1. In lieu of the ratchet, a hydraulically actuatable cylinder 26 is included which acts between the lever 8 and the second brake shoe 2. The first brake shoe 1 and the lever 8 are rotatably coupled to each other by means of a separate pin 27. In addition, the spring 11 is fixed to the lever 8 in an oblong hole 28 by which the necessary play "s" is safeguarded. The mode of functioning is just as described above.

What is claimed:

1. An automatic adjusting apparatus for a duo-servo drum brake comprising:

first and second brake shoe assemblies each mounted for outward movement away from one another and inward movement toward one another and each having a brake shoe and a brake lining adapted to abut against a brake drum upon outward movement of said first and said second brake shoe assemblies, said first brake shoe assembly having first adjusting means for adjusting said brake shoes;

a supporting lug for limiting inward movement of said first and said second brake shoe assemblies and against which said first and said second brake shoe assemblies abut in their rest positions;

an expanding device extending from said first brake shoe assembly to said second brake shoe assembly for moving said first and said second brake shoe assemblies outward;

a first spring extending between said first and said second brake shoe assemblies for urging said first and said second brake shoe assemblies to move inward;

and second adjusting means extending from said first brake shoe assembly to brake shoe assembly for adjusting said brake shoes.

2. An automatic adjusting apparatus for a duo-servo drum brake according to claim 1 wherein said first brake shoe assembly includes a lever having a first set of ratchet teeth and said first adjusting means include:

(a) a ratchet lever mounted for pivotal movement on said brake shoe of said first brake shoe assembly and having a second set of ratchet teeth engaging said first set of ratchet teeth, and (b) a second spring for urging said first set of ratchet teeth and said second set of ratchet teeth into engagement as said first brake shoe assembly is moved outward.

3. An automatic adjusting apparatus for a duo-servo drum brake according to claim 2 wherein:

(a) said lever of said first brake shoe assembly and said brake shoe of said second brake shoe assembly abut against said supporting lug, (b) said expanding device extends between said lever of said first brake shoe assembly and said brake shoe of said second brake shoe assembly, and (c) said first spring extends between said lever of said first brake shoe assembly and said brake shoe of said second brake shoe assembly.

4. An automatic adjusting apparatus for a duo-servo drum brake according to claim 3 wherein said second adjusting means include a stepped adjusting unit extending between said lever of said first brake shoe assembly and said brake shoe of said second brake shoe assembly.

5. An automatic adjusting apparatus for a duo-servo drum brake according to claim 4 wherein said stepped adjusting unit is infinitely adjustable.

6. An automatic adjusting apparatus for a duo-servo drum brake according to claim 4 wherein, with respect to said brake drum, said supporting lug is positioned radially outward of said first spring and said stepped adjusting unit is positioned radially outward of said supporting lug.

7. An automatic adjusting apparatus for a duo-servo drum brake according to claim 6 wherein said stepped adjusting unit is a ratchet.

8. An automatic adjusting apparatus for a duo-servo drum brake according to claim 7 wherein said ratchet is configured such that its toothing allows to be screwed back manually.

9. An automatic adjusting apparatus for a duo-servo drum brake according to claim 7 wherein said lever of said first brake shoe assembly has an oblong hole which receives an end of said first spring and said end of said first spring engages said oblong hole only upon a prescribed amount of relative movement between said oblong hole and said first spring.

10. An automatic adjusting apparatus for a duo-servo drum brake according to claim 9 wherein said brake shoes are symmetrical.

11. An automatic adjusting apparatus for a duo-servo drum brake according to claim 10 wherein said second spring is a spiral spring having a pivot axis coincident with the pivot axis of said ratchet lever and said spiral spring has a first arm which bears against said brake shoe of said first brake shoe assembly and a second arm received in a notch in said ratchet lever.

12. An automatic adjusting apparatus for a duo-servo drum brake according to claim 11 further including an equilibrant of forces unit positioned diametrically opposite from said expanding device and extending between said first and said second brake shoe assemblies.

13. An automatic adjusting apparatus for a duo-servo drum brake according to claim 1 wherein said first and said second adjusting means are disposed substantially diametrically opposite from one another.

14. An automatic adjusting apparatus for a duo-servo drum brake comprising:
first and second brake shoe assemblies each mounted for outward movement away from one another and inward movement toward one another and each having a brake shoe and a brake lining adapted to abut against a brake drum upon outward movement of said first and said second brake shoe assemblies,
(a) said first brake shoe assembly including:
 (1) a lever having a first set of ratchet teeth, and
 (2) first adjusting means for adjusting said brake shoes and including:
  (i) a ratchet lever mounted for pivotal movement on said brake shoe of said first brake shoe assembly and having a second set of ratchet teeth engaging said first set of ratchet teeth, and
  (ii) a first spring for urging said first set of ratchet teeth and said second set of ratchet teeth into engagement as said first brake shoe assembly is moved outward, and
(b) said brake shoe of said second brake shoe assembly having an oblong hole;
an expanding device extending between said lever of said first brake shoe assembly and said brake shoe of said second brake shoe assembly for moving said first and said second brake shoe assemblies outward;
a second spring extending between said lever of said first brake shoe assembly and said brake shoe of said second brake shoe assembly for urging said first and said second brake shoe assemblies to move inward;
a supporting lug positioned, with respect to said brake drum, radially outward of said second spring for limiting inward movement of first and said second brake shoe assemblies and against which said lever of said first brake shoe assembly and said brake shoe of said second brake shoe assembly abut in their rest positions;
and second adjusting means positioned, with respect to said brake drum, radially outward of said supporting lug and including a stepped adjusting unit in the form of a ratchet extending between said lever of said first brake shoe assembly and said brake shoe of said second brake shoe assembly for adjusting said brake shoes, said stepped adjusting unit having an end received by said oblong hole of said brake shoe of said second brake shoe assembly and engaging said oblong hole only upon a prescribed amount of relative movement between said oblong hole and said stepped adjusting unit.

15. An automatic adjusting apparatus for a duo-servo drum brake according to claim 14 wherein said brake shoes are symmetrical.

16. An automatic adjusting apparatus for a duo-servo drum brake according to claim 15 wherein said second spring is a spiral spring having a pivot axis coincident with the pivot axis of said ratchet lever and said spiral spring has a first arm which bears against said brake shoe of said first brake shoe assembly and a second arm received in a notch in said ratchet lever.

17. An automatic adjusting apparatus for a duo-servo drum brake according to claim 16 further including an equilibrant of forces unit positioned diametrically opposite from said expanding device and extending between said first and said second brake shoe assemblies.

18. An automatic adjusting apparatus for a duo-servo drum brake according to claim 17 wherein said equilibrant of forces unit includes:
(a) a housing,
(b) a cylindrical compression spring within said housing,
(c) a plate having a first face against which one end of said cylindrical compression spring bears,
(d) a threaded pin fixed to said housing and extending through said cylindrical compression spring and said plate, and
(e) a nut screwed onto said threaded pin and bearing against a second face of said plate opposite from said first face to prestress said cylindrical compression spring.

19. An automatic adjusting apparatus for a duo-servo drum brake comprising:
first and second brake shoe assemblies each mounted for outward movement away from one another and inward movement toward one another and having symmetrical brake shoes and a brake lining adapted to abut against a brake drum upon outward movement of said first and said second brake shoe assemblies, (a) said first brake shoe assembly including:
  (1) a lever having an oblong hole and a first set of ratchet teeth, and
  (2) first adjusting means for adjusting said brake shoes and including:
    (i) a ratchet lever mounted on said brake shoe of said first brake shoe assembly for pivotal movement about a pivot axis and having a notch and a second set of ratchet teeth engaging said first set of ratchet teeth, and
    (ii) a spiral spring for urging said first set of ratchet teeth and said second set of ratchet teeth into engagement as said first brake shoe assembly is moved outward and having:
      a pivot axis coincident with said pivot axis of said ratchet lever,
      a first arm bearing against said brake shoe of said first brake shoe assembly, and
      a second arm received in said notch in said ratchet lever,
(b) said brake shoe of said second brake shoe assembly having an oblong hole;
an expanding device extending between said lever of said first brake shoe assembly and said brake shoe of said second brake shoe assembly for moving said first and said second brake shoe assemblies outward;
a second spring extending between said lever of said first brake shoe assembly and said brake shoe of said second brake shoe assembly for urging said first and said second brake shoe assemblies to move inward, said second spring having an end received by said oblong hole of said lever of said first brake shoe assembly and engaging said oblong hole only upon a prescribed amount of relative movement between said oblong hole and said second spring;
a supporting lug positioned, with respect to said brake drum, radially outward of said second spring for limiting inward movement of said first and said second brake shoe assemblies and against which said lever of said first brake shoe assembly and said brake shoe of said second brake shoe assembly abut in their rest positions;
second adjusting means positioned, with respect to said brake drum, radially outward of said supporting lug and including a stepped adjusting unit in the form of a ratchet extending between said lever of said first brake shoe assembly and said brake shoe of said second brake shoe assembly for adjusting said brake shoes;
and an equilibrant of forces unit positioned diametrically opposite from said expanding device and extending between said first and said second brake shoe assemblies and including:
  (a) a housing,
  (b) a cylindrical compression spring within said housing,
  (c) a plate having a first face against which one end of said cylindrical compression spring bears,
  (d) a threaded pin fixed to said housing and extending through said cylindrical compression spring and said plate, and
  (e) a nut screwed onto said threaded pin and bearing against a second face of said plate opposite from said first face to prestress said cylindrical compression spring.

* * * * *